(12) United States Patent
Argue et al.

(10) Patent No.: US 8,447,654 B1
(45) Date of Patent: May 21, 2013

(54) DETERMINATION OF CUSTOMER PROXIMITY TO A REGISTER THROUGH USE OF SOUND AND METHODS THEREOF

(71) Applicants: Stuart Argue, Palo Alto, CA (US); Anthony Emile Marcar, San Francisco, CA (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/625,773

(22) Filed: Sep. 24, 2012

(51) Int. Cl.
*G06Q 20/00* (2012.01)
*G08B 1/08* (2006.01)
*G06F 17/00* (2006.01)

(52) U.S. Cl.
USPC ............................ 705/16; 340/539.13; 700/94

(58) Field of Classification Search
USPC ................................................ 705/16; 700/94
See application file for complete search history.

(56) References Cited

U.S. PATENT DOCUMENTS

| | | | |
|---|---|---|---|
| 2006/0085270 A1* | 4/2006 | Ruckart | 705/21 |
| 2010/0008515 A1* | 1/2010 | Fulton et al. | 381/92 |
| 2010/0070369 A1* | 3/2010 | Fenton et al. | 705/14.58 |
| 2010/0134278 A1* | 6/2010 | Srinivasan et al. | 340/539.13 |
| 2010/0332668 A1* | 12/2010 | Shah et al. | 709/229 |
| 2012/0095853 A1* | 4/2012 | von Bose et al. | 705/16 |
| 2012/0271715 A1* | 10/2012 | Morton et al. | 705/14.53 |

OTHER PUBLICATIONS

Tarzia, Stephen. Acoustic sensing of location and user presence on mobile computers. (Aug. 31, 2011). Electrical Engineering and Computer Science Department, Northwestern University. vol. 7212B of Dissertations Abstracts International.*

Mandal et al., Beep: 3D indoor positioning using audible sound. (2005). 2005 2nd IEEE Consumer Comminicaiotns and Networking Conference (IEEE Cat. No. 05EX954). IEEE, Piscataway, NJ, pp. 348-353.*

* cited by examiner

*Primary Examiner* — Scott Zare
(74) *Attorney, Agent, or Firm* — Stevens Law Group; David R. Stevens

(57) ABSTRACT

A method is disclosed for determining a customer's proximity to a checkout register at a store. A mobile electronic device with mobile self-checkout software thereon may record and analyze ambient noise to determine when a customer is in a checkout line as well as to track the customer's progress through the checkout line. The mobile self-checkout software may present information to the customer according to the customer's position in the checkout line. The type and nature of the information presented to the customer may be changed according to the customer's distance from the checkout terminal as well as how quickly the customer is approaching the terminal. The software may provide detailed data about the shopping and checkout experience. This information may be correlated to customer satisfaction and used identify particular strengths and weaknesses in the shopping experience offered by a store.

4 Claims, 12 Drawing Sheets

DETERMINATION OF CUSTOMER PROXIMITY TO A REGISTER THROUGH USE OF SOUND AND METHODS THEREOF

RELATED APPLICATIONS

This application is related to U.S. application Ser. No. 13/625,789, filed Sep. 24, 2012 and U.S. application Ser. No. 13/625,810, filed Sep. 24, 2012

BACKGROUND

1. Field of the Invention

This invention relates to point-of-sale systems and more particularly to systems and methods for determining customer proximity to a checkout register as well as adaptive communication with the customer based on proximity to the checkout register.

2. Background of the Invention

A significant labor expense in a retail establishment is operating checkout registers. Additionally, the checkout process is often viewed as tedious and time consuming to a customer. Accordingly, what is needed is a system and method for improving the checkout process. There is a need for a system which speeds up the checkout process and which also engages the customer to improve customer satisfaction with the checkout process.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
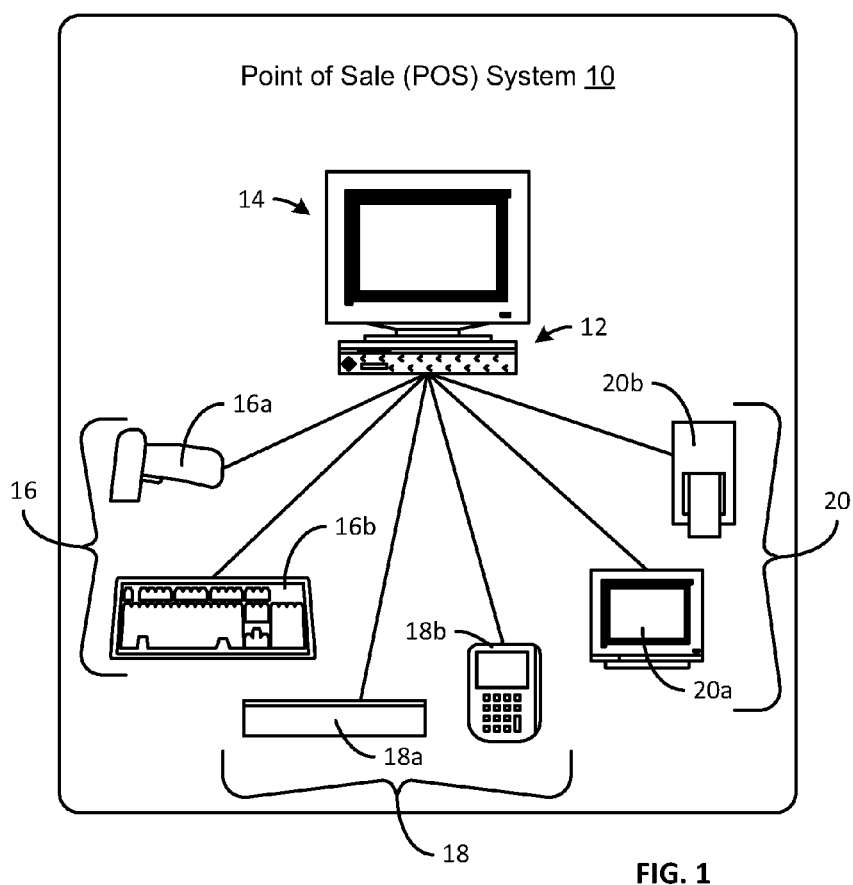
FIG. 1 is a schematic block diagram of one embodiment of a point-of-sale (POS) system for implementing methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide a system and methods for facilitating the checkout process at a store. The invention has been developed to provide a checkout process where a customer may use software (which may include checkout software to facilitate the checkout process including mobile self-checkout software to facilitate self-checkout, herein referred to generally as mobile self-checkout software) on a mobile electronic device such as a tablet computer or a mobile telephone. The mobile self-checkout software may interact with the customer during the checkout process.

In selected embodiments, the checkout process may involve the customer's mobile electronic device, such as a smart phone or tablet. The software may interact with the POS terminal to determine the customer's proximity to a POS terminal. Upon interaction with the POS terminal, the software may then interact with the customer and allow the customer to proceed with the checkout process.

In certain embodiments, a machine-readable code may be used to interact between the customer's mobile electronic device and the POS system. The machine readable code may comprise a conventional barcode or a two-dimensional barcode (e.g., a Quick Response (QR) Code). The data encoded within a machine-readable code may vary between different embodiments and different purposes or goals of the embodiment. In selected embodiments, a machine-readable code may encode a transaction identification (ID) uniquely identifying a particular transaction (e.g., purchase, return, or the like). Alternatively, or in addition thereto, a machine-readable code may encode data regarding the POS terminal and/or the store where the terminal is located.

In certain embodiments, sound may be used to interact between the customer's mobile electronic device and the POS system. The mobile electronic device may detect sound from the store environment and from the POS system. The detected sound may be processed to determine the customer's location within a store and, more particularly, the customer's proximity to a checkout POS terminal.

In certain embodiments, software on the customer's mobile electronic device may change functionality or modify how it interacts with the customer based on the customer's proximity to a POS terminal. The software may provide different information to the customer and may initiate different steps of the checkout process based on proximity to a POS terminal.

In general, the purpose of a return system is to facilitate a checkout process which is convenient and pleasant to the customer. To improve customer satisfaction with the checkout process, a desired measure of information and entertainment may be provided to the customer. Many challenges arise in using a mobile self-checkout system and in using software on a customer's mobile electronic device during the checkout process. In particular, the use of electronic mobile self-checkout raises a variety of challenges in ensuring that the checkout process is handled in compliance with store policy. For example, it may be desirable that a customer proceed with the checkout process in a desired order. It is also desirable to make the checkout process streamlined and convenient, as this improves the customer experience as well as reduces the store workload to complete a checkout or sales transaction.

In completing a checkout with mobile self-checkout software on a mobile electronic device, it may often be desirable to provide the customer with information regarding the checkout process. This may ensure that the customer proceeds properly through the checkout process. This may also minimize confusion for first time mobile self-checkout customers. It may also be desirable to provide the customer with information regarding the items that the customer has selected for purchase or regarding additional items related to those items selected for purchase. It may be desirable to provide different types of information to the customer based on the customer's progress through the checkout process. It may be desirable to determine the customer's progress through the checkout process based on the customer's proximity to a POS terminal.

It is often desirable that certain features of mobile self-checkout software on the customer's mobile electronic device are triggered when the customer is nearing a POS terminal at a store to complete a purchase. For example, as the customer nears a POS terminal for checkout the software may present the customer with product information and advertising. As the customer nears the POS terminal the software may change the type of information presented to the customer and may present information regarding the checkout process. Data may be exchanged between the customer's mobile electronic device and the POS terminal or the POS terminal environment to verify that the customer is proceeding through a purchase.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a mobile electronic device or a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support processing transactions involving software on a mobile electronic device.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
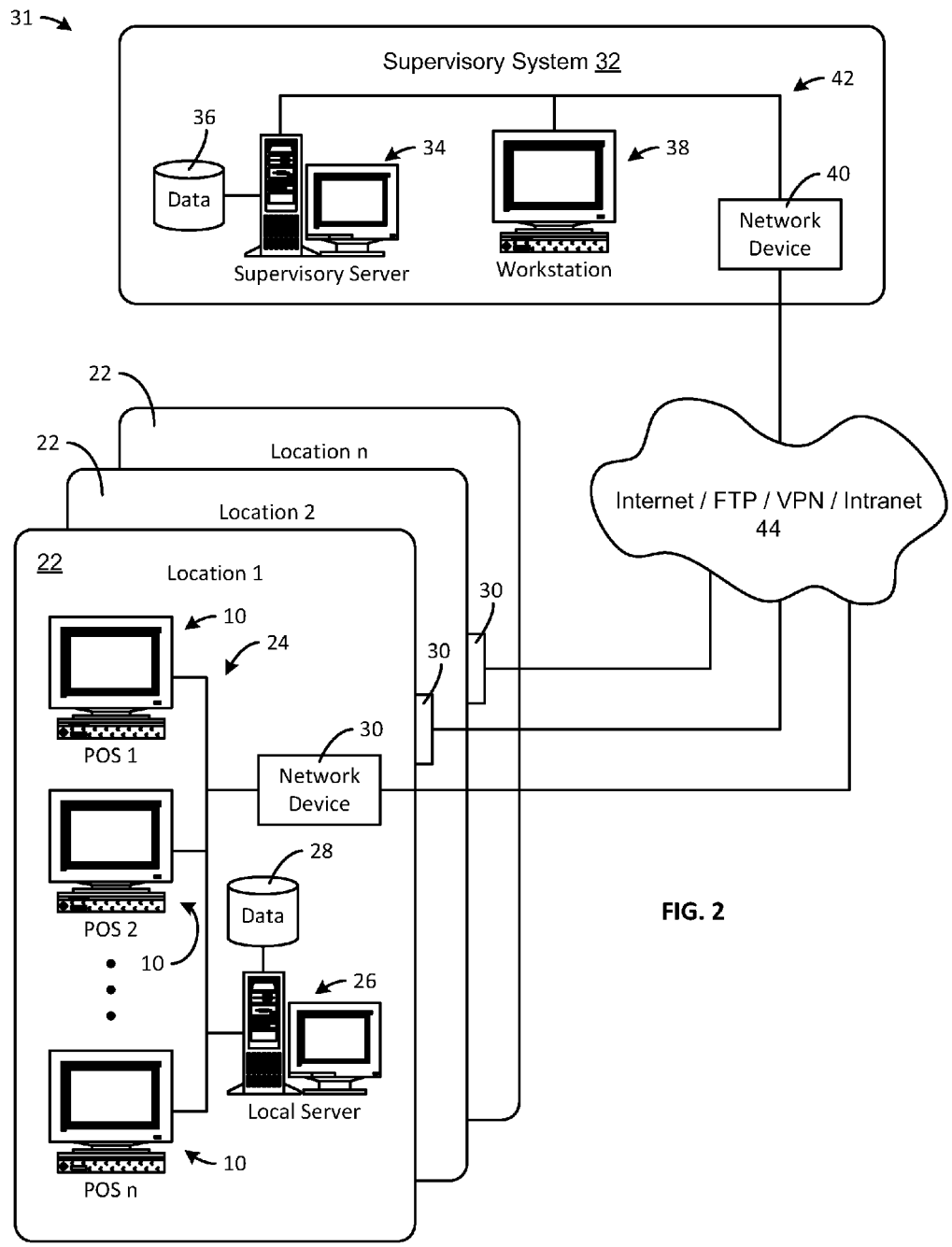
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

Figure 3:
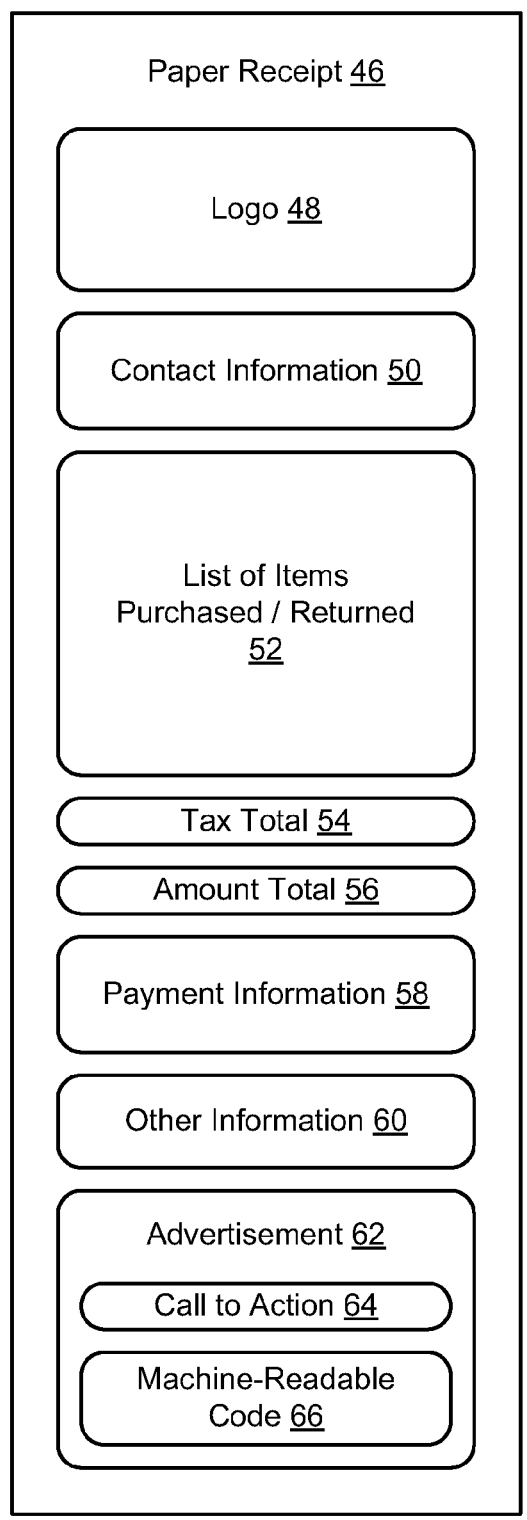
FIG. 3 is a schematic block diagram of one embodiment of a receipt in accordance with the present invention.

Referring to FIG. 3, in selected embodiments in accordance with the present invention, a POS system 10 may output a receipt 46. For example, a printer 20b of a POS system 10 may output a paper receipt 46. A receipt 46 may perform various functions. Primarily, a receipt 46 may document a financial transaction (e.g., sale or return). However, a receipt 46 may also deliver one or more marketing messages to a consumer. In selected embodiments, a receipt 46 may include a logo 48, contact information 50, a list 52 of items purchased or returned, a total 54 indicating the sales tax assessed or returned, a total 56 indicating 56 the amount paid or returned, payment information 58, other information 60, or the like or combinations or sub-combinations thereof.

A logo 48 may reinforce the brand and image of the associated entity within the mind of a consumer. By including contact information 50 on a receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within a receipt 46 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like. The other information 60 will also typically include a machine readable code such as a barcode which provides identifying information about the transaction. The barcode may include information such as the store where the items were purchased, the time of purchase, the total price of the transaction, etc.

In selected embodiments, a receipt 46 may include an advertisement 62. An advertisement 62 may include a call to action 64 inviting or motivating a recipient of the receipt 46 to take a particular step or action. For example, a call to action 64 may invite or motive a consumer to visit a particular website, download a particular application, or the like. Thus, the call to action 64 may invite a customer to download a mobile self-checkout application to their mobile electronic device. To increase the likelihood that a consumer will respond favorably to the call to action 64, an advertisement 62 may include an enabler facilitating the desired step or action. For example, in selected embodiments, an advertisement 62 may include a machine-readable code 66. Upon scanning the code 66 (e.g., scanning the code 66 using a camera on a mobile computing device such as mobile telephone, personal digital assistant (PDA), or tablet computer or reader, or the like), a consumer may be directed to a desired website (e.g., a particular URL), initiate the download of a particular application, initiate the download of a resource corresponding to a transaction (e.g., an electronic receipt), or the like.

A machine-readable code 66 may comprise a barcode. For example, in certain embodiments, a machine-readable code 66 may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

The data encoded within a machine-readable code 66 may vary between different embodiments and different purposes (e.g., purposes or goals of an advertisement 62). In selected embodiments, a machine-readable code 66 may encode a transaction identification (ID). A transaction ID may uniquely identify a particular transaction (e.g., a transaction documented by a corresponding receipt 46). Alternatively, or in addition thereto, a machine-readable code 66 may further encode an advertisement ID (e.g., an ID indicating which particular combination of call to action 64, graphics, or the like accompanied the machine-readable code 66). A machine-readable code 66 may also encode a web address or URL.

As with a machine-readable code 66, the nature or characteristics of an advertisement 62 and call to action 64 may vary according to a purpose thereof. In general, the purpose of an advertisement 62 and the various components 64, 66 thereof may be to benefit, economically or otherwise, a consumer, an entity (e.g., an entity issuing the receipt 46), or some combination thereof. For example, in selected embodiments, the purpose of an advertisement 62 may be to transition a customer to using a mobile self-checkout application.

At one level, the use of mobile self-checkout may conserve resources by reducing the need for cashiers. The use of mobile self-checkout may have other advantages to both a consumer and the store. For example, mobile self-checkout may enable a consumer to complete a purchase more quickly. Additionally, mobile self-checkout may allow a store to provide targeted information to the consumer.

Figure 4:
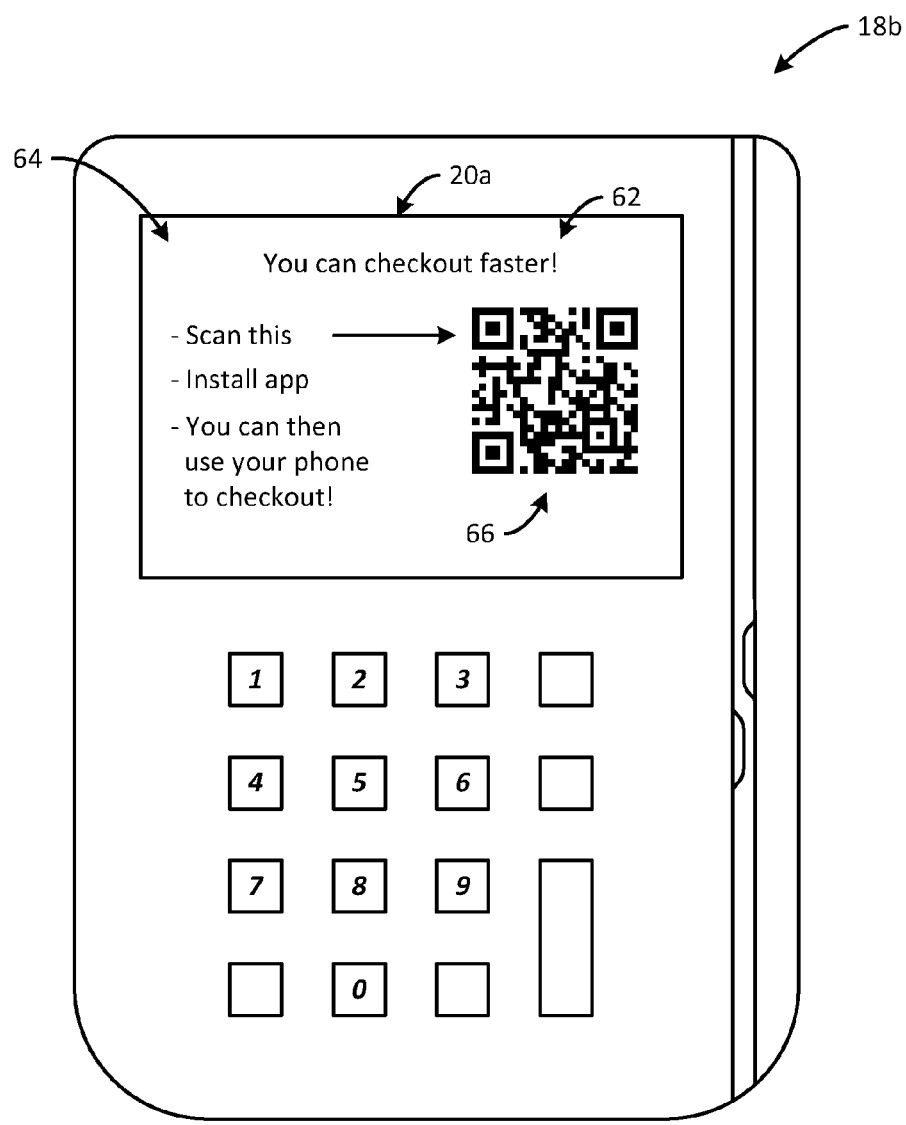
FIG. 4 is an illustration showing how a card reader (e.g., credit card reader, debit card reader) may be used as a customer-facing display in certain embodiments in accordance with the present invention.

Referring to FIG. 4, as set forth hereinabove, an advertisement 62 may be presented to a customer via a printed receipt 46. Alternatively, or in addition thereto, an advertisement 62 (e.g., the same advertisement 62 or a different advertisement 62) may be presented to a customer via some other output mechanism 20. For example, in selected embodiments, one or more advertisements 62 may be presented to a customer via a card reader 18*b* or a customer-facing display screen 20*a*.

A customer-facing display 20*a* may take various forms. In selected embodiments, a customer-facing display 20*a* may be embodied as a stand-alone monitor dedicated to presenting information, advertisements 62, or the like to a customer at a POS. Alternatively, a customer-facing display 20*a* may be a multi-use screen capable of performing various functions. For example, in certain embodiments, a customer-facing display 20*a* may be embodied as a screen on a card reader 18*b*. That is, during at least some portion of a transaction, an advertisement 62 may be displayed on a screen or a portion of a screen of a card reader 18*b*.

Figure 5:
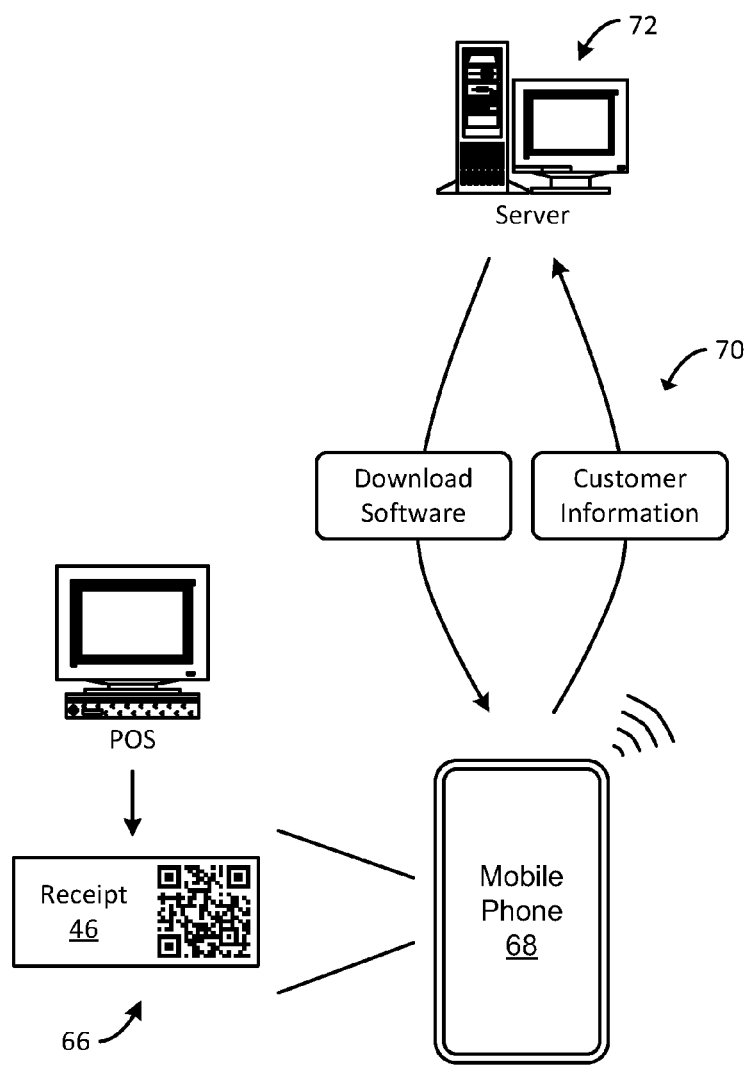
FIG. 5 is a block diagram illustrating the flow of data within one embodiment of system in accordance with the present invention.

Referring to FIG. 5, a customer may download software to a mobile electronic device 68. The mobile electronic device 68 may be a smart phone, tablet PC, etc. Often, the customer will have previously received a paper receipt 46 which includes an invitation to use mobile self-checkout. The paper receipt 46 may have had a machine readable code 66, such as a QR code. The machine readable code may have information embedded there such as a webpage address where the customer may download software to the mobile electronic device 68. As indicated, the customer may capture the QR code 66 with the camera of the mobile electronic device 68. Upon such, the mobile device 68 may be directed to a webpage where the customer may download the desired software, often referred to as an application, or 'APP'.

As indicated at 70, the customer may provide identifying customer information and create an account with the computer server 72 which handles transactions such as mobile self-checkout or electronic receipts. The computer server 72 may likewise transmit software and account information to the mobile device 68. The customer would then have a customer account with a retailer enabling them to use mobile self-checkout and would have software on a mobile device 68 which enables them to manage their shopping experience and checkout.

Figure 6:
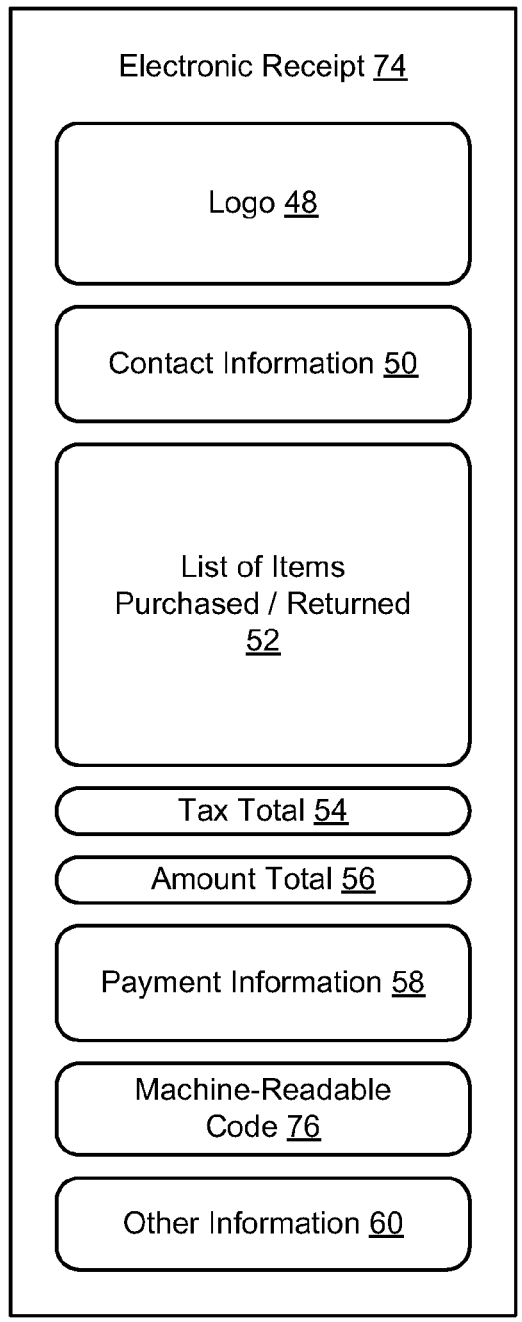
FIG. 6 is a schematic block diagram of one embodiment of a receipt in accordance with the present invention.

Referring to FIG. 6, a POS system 10 may output an electronic receipt 74 in combination with mobile self-checkout. A customer may have elected to receive an electronic receipt instead of a paper receipt. The POS system 10 may then output an electronic receipt 74. An electronic receipt 74 is typically presented to a customer in a manner similar to a paper receipt. The electronic receipt 74 may include a store logo 48, contact information 50, a list 52 of items purchased or returned, a total 54 indicating the sales tax assessed or returned, a total 56 indicating 56 the amount paid or returned, payment information 58, a machine readable code 76 identifying the transaction, and other information 60 as desired, as well as combinations or sub-combinations thereof.

A machine-readable code 76 may comprise a barcode. For example, in certain embodiments, a machine-readable code 76 may comprise a conventional barcode or a two-dimensional barcode such as a QR code. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

Figure 7:
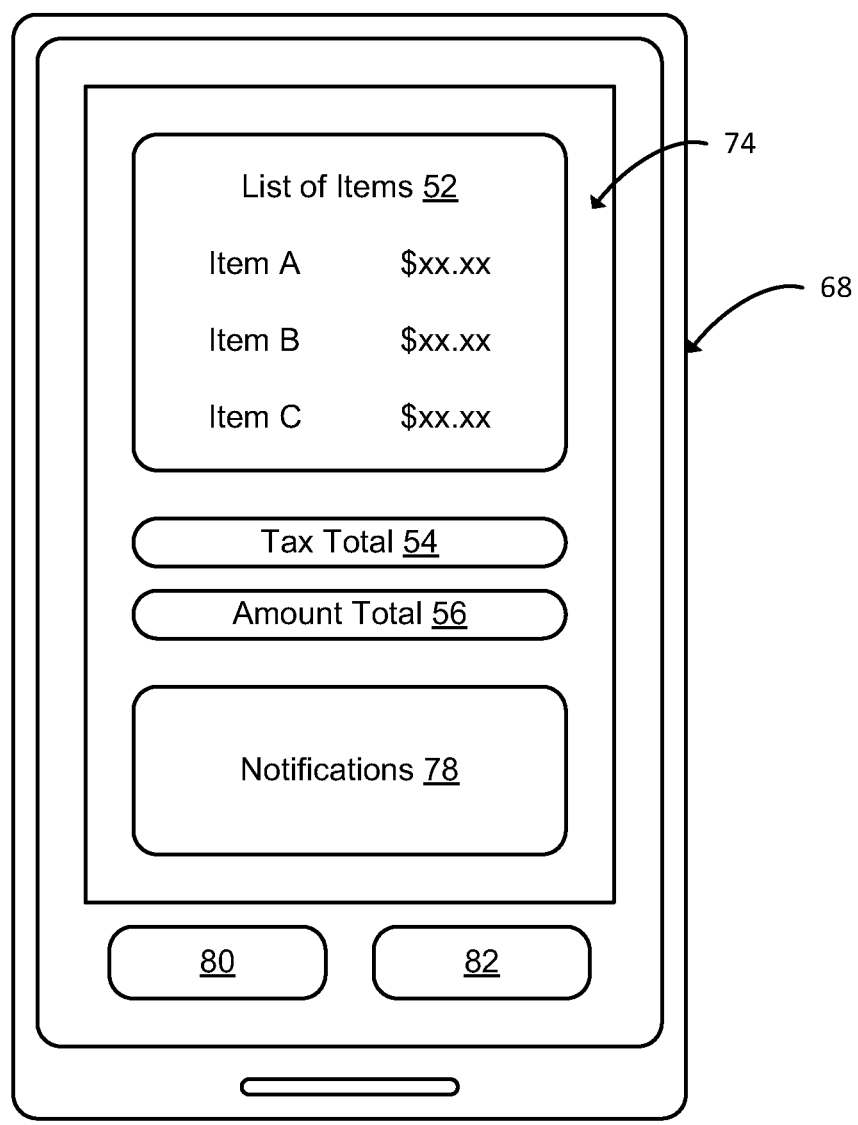
FIG. 7 is a schematic block diagram of one embodiment of a customer interface viewed on a mobile electronic device in accordance with the present invention.

Referring to FIG. 7, the customer's mobile electronic device 68 may display information regarding the shopping and checkout process. The software on the mobile electronic device 68 allows a person to proceed through a mobile self-checkout process, allowing the person to view their shopping cart contents and to manage their purchases. Additionally, the software may interact with the person, providing input into their shopping experience and providing guidance throughout the experience. The mobile device 68 may thus provide the person with shopping information such as a list 52 of items which have been selected and placed into a shopping cart, the amount of tax 54 which will be paid, and the total amount 56 of the purchase. Additionally, the mobile electronic device 68 may provide the person with additional information or notifications 78. The additional information or notifications 78 may be selected to be consistent with the current progress of the person's shopping trip as discussed. The mobile self-checkout software may also provide virtual buttons 80, 82 to the customer to facilitate completion of various steps necessary for completing a purchase.

Figure 8:
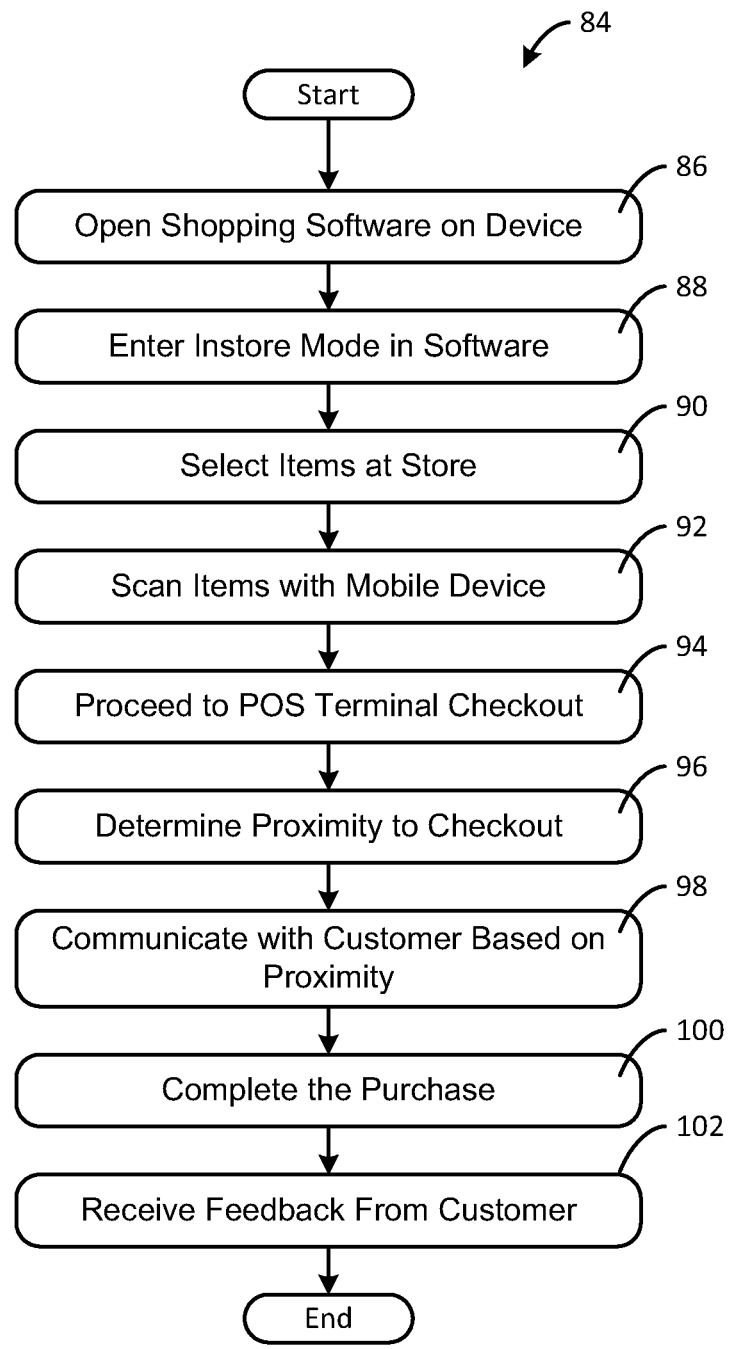
FIG. 8 is a block diagram of one embodiment of a method for completing a purchase in accordance with the present invention.

Referring to FIG. 8, a customer may proceed through a shopping experience with a mobile self-checkout application. FIG. 8 generally illustrates the process 84 which is used to accomplish a purchase with mobile self-checkout software. The customer may open shopping software on their mobile electronic device 86. Commonly, the mobile electronic device may be a tablet computer or a smart phone 68. It is typically desirable that the shopping software provide functionality to assist a person throughout their shopping experience. As such, the shopping software may provide input or communicate with the customer throughout the shopping experience.

The customer may enter an in store mode 88 on the software application when they enter a store in order to make a purchase. As the customer proceeds through the store, they may select items 90 at the store for purchase. The customer may scan the selected items 92 with their mobile electronic device 68. This may be accomplished a camera feature on the mobile electronic device and barcode processing functionality in the shopping software. As the customer scans items for purchase, they may put the items into a shopping basket or a shopping cart. The shopping software may conveniently display a list 52 of the items which have been scanned for purchase on the mobile electronic device, allowing the customer to easily review their cart contents and to make purchasing decisions.

When the customer has selected the desired items for purchase and scanned these items into their mobile electronic device 68, the customer may then go to a POS terminal to checkout 94. The software may determine that the customer is approaching a POS terminal and enter a checkout mode. As the customer approaches the POS terminal, waits in line at the checkout terminal, and proceeds forwards to checkout, the software may communicate with the customer 98 based on the customer's proximity to the POS terminal. The mobile self-checkout software may communicate with the customer via the mobile device 68. Such communications may include the various different informational, promotional, entertainment, etc. material discussed.

When the customer arrives at the POS terminal to checkout, the software and mobile device 68 may pair with the POS terminal. Typically, data will be shared between the POS terminal and the mobile electronic device. Particularly, information regarding items which the customer has selected and scanned may be sent to the POS terminal and these items may be added to the pending transaction. The customer may then proceed with the checkout process.

The mobile self-checkout software may thus operate in different modes. By way of example, the software may operate in a first mode while the customer is shopping. In such a mode the software may primarily facilitate the selecting of items and the scanning of item barcodes into a list of items for purchase. The software may operate in a second mode while the customer is in a checkout line. More particularly, the software may operate in a second mode while the customer is in a checkout line and farther away from a POS terminal, a third mode while the customer is in a checkout line and near particular items such as snack foods whereby targeted advertisements may be presented to the customer, and a fourth mode while the customer is in a checkout line and is near a POS terminal. The software may operate in a fifth mode while the customer is at the POS terminal to complete a purchase. The mobile self-checkout software may operate in these and other modes according to the present disclosure.

After or during the checkout process, the mobile self-checkout software may communicate with the customer to receive feedback from the customer. In particular, the software may obtain feedback about the checkout experience. The customer feedback may be correlated to the actual checkout process experienced by the customer.

Figure 9:
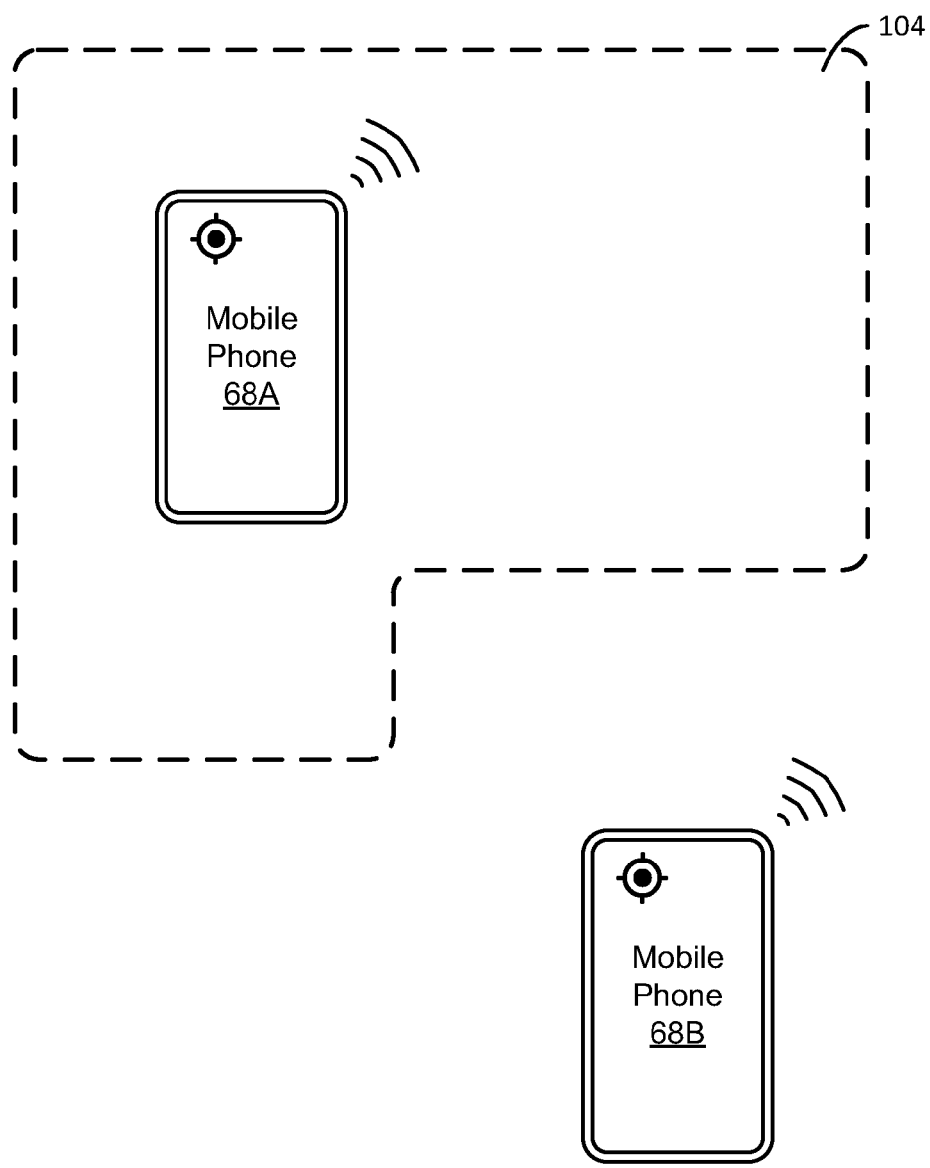
FIG. 9 is a block diagram of one embodiment of a method for verifying the location of a mobile electronic device in accordance with the present invention.

Referring to FIG. 9, the mobile self-checkout software enables or proceeds with certain features and functionality when the customer is inside of a store or, more particularly, at a POS terminal to complete a transaction. As a first measure of verifying that the customer is proceeding with a purchase, the mobile self-checkout software may use geofencing to determine whether a customer is in or near a store or not. The mobile self-checkout software may activate a GPS unit within the mobile electronic device 68 to determine the location of the device. The mobile self-checkout software may then compare the location of the mobile device 68 with the known geographic locations of a store 104 to determine if a customer is likely in the store 104 or not.

By way of example, the mobile self-checkout software may communicate the location of the mobile electronic device 68 to a store server and the server may compare the location of the device 68 to known store locations. Alternatively, the mobile self-checkout software may include data identifying the geographic locations of the stores near the customer. This data may be downloaded when the customer installs the software, or may be downloaded as necessary due to the customer using the mobile self-checkout software.

By comparing the location of the mobile electronic device 68 with the geographic perimeter or location of a store 104, the mobile self-checkout software may distinguish whether the mobile device 68 is inside of or near to the store (68A) or at a location outside of the store (68B). If the mobile electronic device 68 is near or inside of a store 104, the mobile self-checkout software may recognize that the customer is likely at the store to make a purchase and may proceed with checkout functionality as desired.

The mobile self-checkout software may determine when a customer is ready to checkout. The software may use motion sensors within a mobile phone, for example, to determine if the customer is walking. If a customer has stopped walking, they may be in a checkout line.

Figure 10:
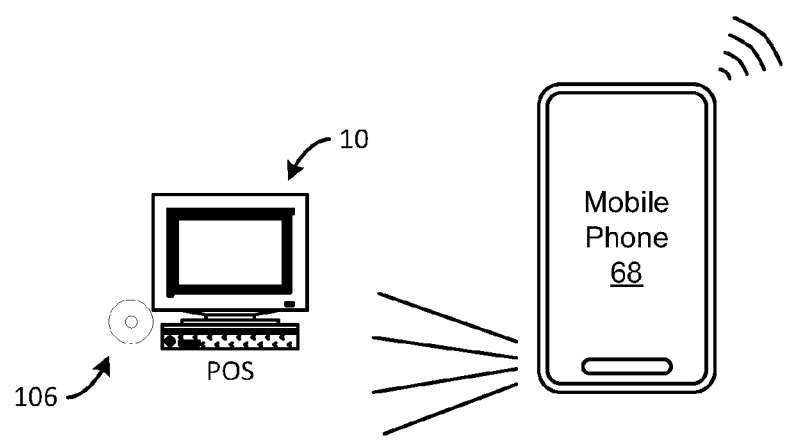
FIG. 10 is a block diagram of one embodiment of a method for verifying the location of a mobile electronic device in accordance with the present invention.

Referring to FIG. 10, the mobile self-checkout software may use sound waves to determine if a customer is at or near a POS terminal to complete a purchase. The mobile self-checkout software may use the microphone of the mobile electronics device 68 to listen to and record sound from the POS terminal 10 and related equipment. The recorded sound may be analyzed to determine if the sound represents a POS terminal or is consistent with sounds present at a POS terminal.

By way of example, the mobile self-checkout software may turn the microphone of the mobile electronic device 68 on and record a sample of noise. The mobile self-checkout software may then analyze the recorded noise to determine if the noise is consistent with a POS terminal. For example, the mobile self-checkout software may perform a fast Fourier transform on the recorded noise sample to convert the time domain sample into a frequency domain sample. This frequency domain sample may be compared with known sound samples to determine if the sound was likely recorded at a POS terminal. For example, the hum of an IBM 4690 terminal, the sound of a conveyor belt, specific sound produced by a speaker, or the "beep" of a barcode scanner may indicate that the sound recording was likely taken at a POS terminal. The mobile self-checkout software may then determine that the mobile electronic device is at a POS terminal.

The mobile self-checkout software may analyze the noise to determine whether the customer is at a POS terminal or not. Additionally, the software may analyze the noise to determine what type of POS terminal the customer is at. By way of example, traditional checkout registers typically make a slightly different noise than self-checkout registers. Because the traditional checkout registers are different brands than the self-checkout registers, they will typically make a different frequency of sound or duration of beep when an item is scanned.

Additionally, items will typically be scanned at a higher rate at a traditional checkout register as compared to a self-checkout register. At a traditional register, items will typically be placed on a conveyor or other surface for the sales associate, allowing the sales associate to quickly scan the items. At a self-checkout register, the customer will typically remove items from their cart or basket one at a time and scan the items. Thus, items will typically be scanned at a faster rate at a traditional register. This means that a traditional register will produce scanning beeps at a faster rate than a self-checkout register. Additionally, a self-checkout lane would not typically have a conveyor belt so the mobile self-checkout software may use the presence or absence of a conveyor belt to assess whether the customer is at a self-checkout lane or a traditional register. Accordingly, the mobile self-checkout software may determine whether the customer is waiting to checkout at a traditional register or a self-checkout register.

The mobile self-checkout software may monitor the duration between scanning beeps and the duration of time that scanning beeps have been detected by the microphone to determine that a customer is in a checkout line. If desired, the software may inquire if the customer is in fact in a checkout line and is ready to checkout, such as by presenting a message 78 on the mobile electronic device 68. The user may press a button 80 to confirm that they are in a checkout line.

The mobile self-checkout software may monitor the volume or intensity of the scanning beeps or other sounds detected by the microphone and use the beep volume to determine the customer's proximity to the POS terminal. The software may monitor changes in the scanning beep volume to determine the customer's progress through the checkout line. When the customer reaches the POS terminal, the software may detect additional sounds such as the hum of the POS terminal computer. As discussed, the mobile self-checkout software may monitor the sounds present at a POS terminal such as the occurrence, frequency, intensity, and rate of repetition or time between beeps. From this information, the mobile self-checkout software may determine if the customer is in a checkout line, whether the customer is at a conventional POS terminal (one which is operated by a sales associate) or a self-service POS terminal, how far the customer is from the POS terminal, and how quickly the customer is moving towards the POS terminal.

The mobile self-checkout software may use a particular predetermined sound to determine if the mobile electronic device 68 is at a POS terminal or to assist in determining the proximity of the mobile electronic device 68 (and the customer) to the POS terminal. By way of example, a speaker 106 or another transducer may be used to play a particular, preselected sound. This sound may be preselected and known to the mobile self-checkout software as being indicative of a POS terminal. As a customer approaches the POS terminal, the microphone of the mobile device 68 may detect and record the sound. The mobile self-checkout software may perform a fast Fourier transform to convert the data into the frequency domain, and the mobile self-checkout software may recognize the sound as indicating a POS terminal. In many situations, it may be preferable that the sound which is played to indicate the POS terminal to the mobile self-checkout software may be inaudible to humans. Such a predetermined sound may be useful in allowing the mobile self-checkout software to determine the customer's proximity to the POS terminal as well as in determining when the customer has reached a threshold distance from the POS terminal.

The mobile self-checkout software may contain one or more sound samples which may be used to analyze or compare the recorded sound to determine if the customer is at a POS terminal. By way of example, the mobile self-checkout software may contain a predetermined sound sample (i.e. the sound played by speaker 106) as well as sound samples of an item scanner or POS terminal computer. These sound samples may be present as a sound sample, such as a conventional time domain sound. These sound samples may also be present as a frequency domain sample.

The mobile self-checkout software may simply compare the recorded sound to a known sound sample (in the time domain). This may work well where the POS terminal plays a predetermined sound from a speaker 106 or where a predetermine sound is otherwise played in association with the POS terminal. This may work particularly well where the predetermined sound is inaudible to humans, such as a high frequency noise, as these sounds may be easier for the electronic returns software to identify from the background noise in the recorded sound.

Figure 11:
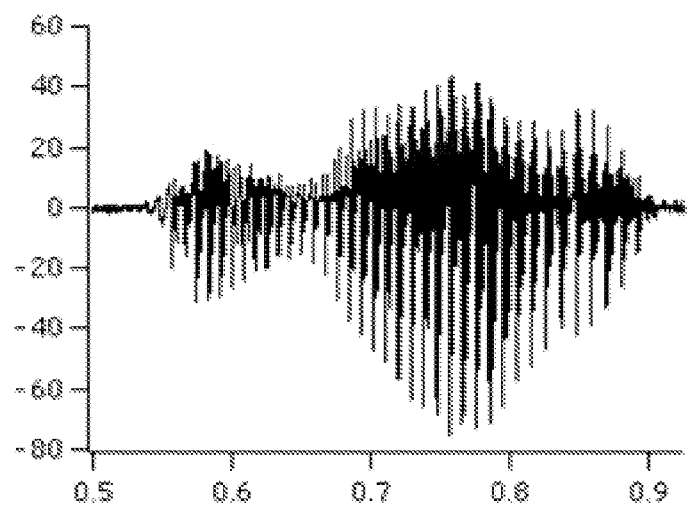
FIG. 11 is a graph illustrating a method for verifying the location of a mobile electronic device in accordance with the present invention.
Figure 12:
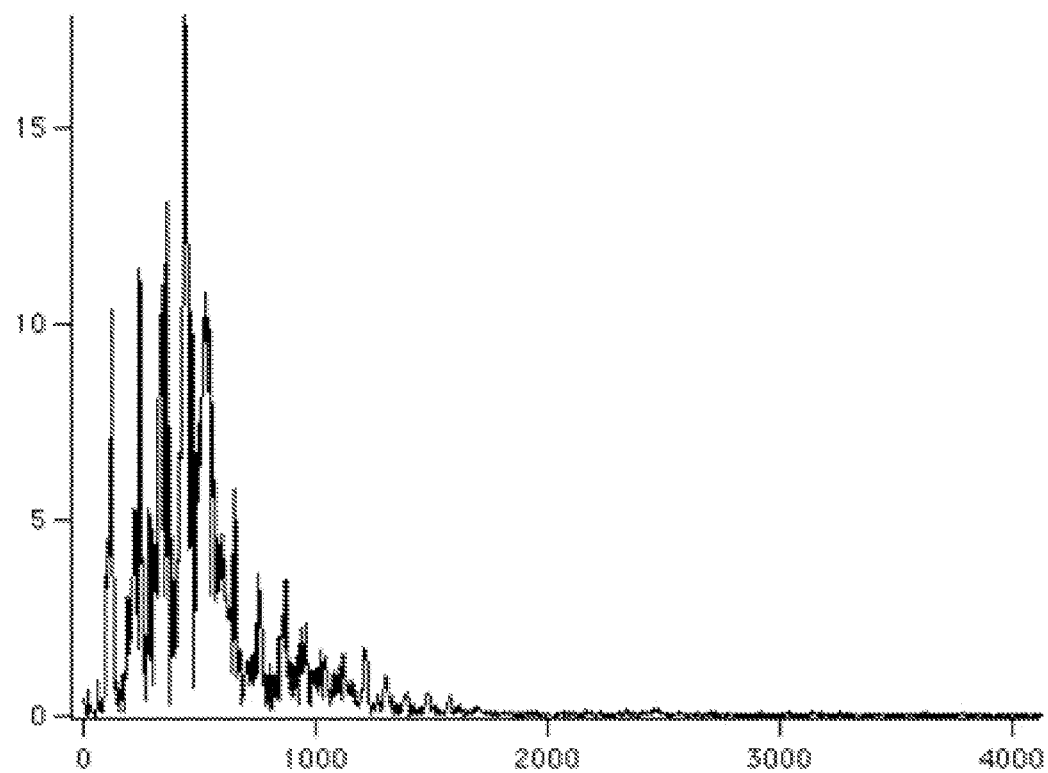
FIG. 12 is a graph illustrating a method for verifying the location of a mobile electronic device in accordance with the present invention.

The mobile self-checkout software may also process or analyze the recorded sound before comparison to a known standard. Referring to FIG. 11, an exemplary sound recording which has been sampled by the mobile self-checkout software will display the pattern of oscillating sound over a period of time. FIG. 12 shows an exemplary fast Fourier transform resulting from the sound sample of FIG. 11. The fast Fourier transform displays the presence of particular frequencies in the sound sample. The fast Fourier transform thus displays the frequency composition of the sound sample, making it easier for the mobile self-checkout software to compare the sound to known sounds and determine if the mobile device 68 is at a POS terminal. The mobile self-checkout software may thus use the fast Fourier transform to analyze the recorded sound and determine if certain characteristic frequencies or combinations of frequencies are present.

Figure 13:
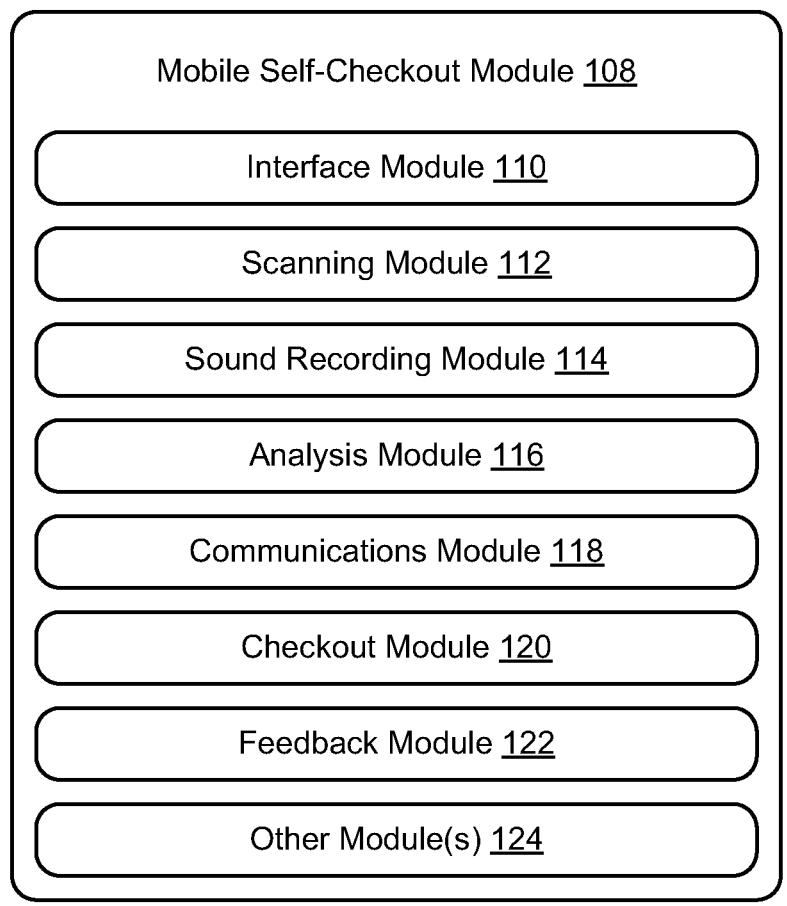
FIG. 13 is a schematic block diagram of one embodiment of a mobile self-checkout module in accordance with the present invention.

Referring to FIG. 13, a computer system in accordance with the present invention may include a mobile self-checkout module 108. The various functions or modules of a mobile self-checkout module 108 may be enacted or implemented by any suitable system or component thereof. For example, in selected embodiments, one or more functions or modules of a mobile self-checkout module 108 may be distributed across one or more hardware devices, including a mobile electronic device 68, a primary computer 12 of a POS system 10, a local server 26, a supervisory server 34 or 72, some other onsite resource, some other offsite resource, or the like or combinations or sub-combinations thereof. Thus, systems and methods in accordance with the present invention may be adapted to a wide variety of situations, including more rigid legacy systems.

In selected embodiments, a mobile self-checkout module 108 facilitates the checkout process described herein. The mobile self-checkout module may include any suitable arrangement of sub-components or modules. The mobile self-checkout module 108 may include an interface module 110 which interfaces with a customer. The interface module may include a display on a mobile electronic device 68. The mobile self-checkout module 108 may also include a scanning module 112 which may include a camera on a mobile electronic device 68 and which facilitates scanning product barcodes. The mobile self-checkout module 108 may include a sound recording module 114 which may include a microphone on a mobile electronic device and which may facilitate recording and detecting ambient sounds.

The mobile self-checkout module 108 may include an analysis module 116 which may facilitate processing and analyzing detected or recorded sounds. The mobile self-checkout module 108 may include a communications module 118 which may present notifications and communications to a customer. The mobile self-checkout module 108 may also include a checkout module 120 which facilitates a customer completing a checkout process at a store. The mobile self-checkout module 108 may include a feedback module 122 which may interact with a customer to collect or process feedback and other information from the customer. The mobile self-checkout module 108 may also include other modules 124 as are desirable to implement aspects of the present invention. The various modules and parts of the mobile self-checkout module 108 may include both hardware, firmware and software components as are desirable to accomplish the present invention and to achieve the various steps, features, and functionality discussed herein.

The mobile self-checkout software may thus analyze a sound recording made by the mobile electronic device 68, process or analyze the sound recording, compare the sound recording with known sound samples or sound information indicative of a POS terminal 10, determine if the mobile electronic device is present in a checkout line or at a POS terminal 10. If the mobile electronic device is present in a checkout line or at a POS terminal, the mobile self-checkout software may provide particular communications to the customer through the mobile electronic device.

The mobile self-checkout software may communicate with the customer through notifications 78 and other communications sent to the customer's mobile electronic device 68. When the software determines that a customer has entered a checkout line, the software may begin to send notifications to the customer. To facilitate communications with the customer, the software and accordingly the mobile electronic device 68 may be in communications with a store server such as server 72 indicated in FIG. 5. The server 72 may provide the software and mobile electronic device 68 with information and notifications 78 as necessary. Additionally, the software may include several types of information and notifications 78 which may be stored on the mobile electronic device 68 and communicated to the customer as desired.

As the customer enters a checkout line, the software may send notifications 78 to the customer which are informational in nature. The notifications may contain information regarding products which the customer has selected for purchased. As the customer may have scanned the bar codes of items for purchase, the software may know which items are in the customer's cart. The mobile self-checkout software may provide information which is entertaining or informative to the customer. In such a situation, the software may provide information regarding items selected for purchase to the customer. Additionally, the software may provide information to the customer which is related to the items selected for purchase, such as accessory items or items which are complimentary in nature to those items selected for purchase. The software may present notifications 78 to the customer indicating features or new uses for products that they are purchasing. The mobile self-checkout software may present amusing advertising content to the customer, helping the customer to enjoy their time in the checkout line. In this manner, the mobile self-checkout software may present material to a customer which is useful to that customer.

The notifications 78 which are presented to the customer may be advertising. By way of example, the mobile self-checkout software may present advertisement notifications 78 to the customer. The advertisement may be based on the items selected for purchase by the customer. As such, the advertisement may encourage the customer to purchase a product which is related to those items selected for purchase. The advertisement may offer the customer a discount for purchasing such a product. The advertisement may be based on the customer's position in a checkout line as well as based on the customer's shopping cart contents. The advertisement 78 may offer a discount or otherwise encourage a customer to purchase an item which is adjacent the customer.

As a customer moves through a checkout line, the mobile self-checkout software may present a coupon or an advertisement to purchase snack food or magazines when the customer is next to these items. The software may contain information regarding the distance of items displayed in a checkout line for the particular store chain. By way of example, the software may know that magazines and snack food are located about 6 feet from the POS terminal. The software may determine the customer's distance from the POS terminal by using the mobile electronic device microphone to record and analyze the types and volumes or sounds present as discussed above. The mobile self-checkout software may track the customer's progress through the checkout line. When the software determines that the customer is approximately 6 feet from the POS terminal, the software may present advertisements encouraging the customer to purchase snack food or a magazine. In this manner, the mobile self-checkout software may track a customer's movement through the checkout line based on proximity to the POS terminal and advertise products to the customer when the customer is adjacent those products.

Additionally, the mobile self-checkout software may provide advertisements to the customer based on their current shopping cart contents or their past purchasing history. Thus, when the customer is adjacent the snack foods, the mobile self-checkout software may present the customer with a notification 78 that encourages the customer to purchase a snack food that they have purchased in the past. The software may suggest a particular magazine to the customer based on cart contents. Where the customer has selected and scanned barcodes for products primarily purchased by a woman, the software may advertise a magazine about celebrities or fashion. Where the customer has selected and scanned barcodes for products primarily purchased by a man, the software may advertise a sports magazine.

The advertisements presented to a customer as described herein are more valuable than conventional advertisements. The mobile self-checkout software presents advertisements to a particular consumer based on their individual shopping history and preferences. More particularly, the mobile self-checkout software is able to present advertisements to a customer when the customer is near the products and in the process of purchasing similar products. The advertisements are thus more likely to be effective, and have greater value than conventional advertising.

The mobile self-checkout software may provide instruction to the user regarding the checkout process as the user arrives at an appropriate place in a checkout line. The software may provide instructions to the customer regarding how to complete a checkout transaction more quickly if it determines that the customer is waiting in line. This will help streamline the process for the customer. When a customer arrives at a POS terminal to checkout, the software may instruct the customer to scan a machine readable code such as a QR code or type in an alphanumeric checkout code to pair their mobile electronic device with the POS terminal and provide the list of scanned items on their mobile electronic device to the POS terminal. A machine readable code may appear on a screen such as the screen of a self-checkout POS terminal. An alphanumeric code may appear on a debit card reader or on another screen. Typically, instructions regarding the checkout process may be stored in the mobile electronic device as part of the mobile self-checkout software. Advertisements and other content may typically be downloaded from a server as needed.

The mobile self-checkout software may advantageously modify the type and nature of the notifications 78 presented to a customer based on how far they are from the POS terminal, how quickly the customer is moving towards the POS terminal, and how long they have been in a checkout line. The behavior of the mobile self-checkout software and the nature of the notifications 78 presented to a customer may change according to how long they have been in a checkout line and how they are progressing through that line.

When the customer is close to the POS terminal or moving quickly towards the POS terminal, the software may present quicker content to the customer. By way of example, a customer may be presented with a brief advertisement or invitation to purchase a snack food item when they are moving quickly through the checkout line. The advertisement may be short, such as presenting a single image of static content to the customer. The mobile self-checkout software may present specific instructions about the checkout process to the customer, informing them what steps to take to complete the checkout process.

When the customer is farther away from the POS terminal or moving slowly towards the POS terminal, the mobile self-checkout software may present longer and more engaging content to the customer. The software may present advertisements to the customer which are longer and which may involve video, animations, or multiple screens of images. The software may present entertaining content to the customer, preventing the customer from becoming frustrated with the checkout process. The software may present more advertising content to the customer when the customer is in a longer line.

As the customer moves closer to the POS terminal or as the checkout line begins to move more quickly, the mobile self-checkout software may change the type and nature of content presented to the customer. The software may begin to present shorter advertising content to the customer rather than longer advertising content. The software may begin to present checkout instructions instead of presenting advertising content. The mobile self-checkout software may optimize the content presented to a customer based on the customer's individual purchasing characteristics, the customer's position in a checkout line, and the customer's progression in the checkout line.

As the customer reaches the POS terminal to checkout and complete their purchase, the mobile self-checkout software may present notifications 78 to the customer about the checkout process. The software may provide instructions to the customer for pairing their mobile electronic device with the POS terminal to communicate with the terminal and transfer data to or from the POS terminal. The mobile electronic device may send information about products that the customer has scanned for purchase. The mobile self-checkout software may provide other instructions necessary for completing the checkout process.

The mobile self-checkout software may also be useful to the store in determining customer satisfaction. More particularly, the software can correlate the customer satisfaction to the customer's checkout experience. In interacting with the customer during the checkout process, the mobile self-checkout software may acquire data including: how long the customer was shopping, how much time occurred between items selected by the customer and scanned into the mobile electronic device, how much time occurred between selecting the last item and entering a checkout line, when the customer began the checkout process, how long the customer was in a checkout line, how fast the checkout line was moving, whether the customer left a checkout line and returned later, whether the changed checkout lines, how much time passed between picking up items for purchase and completing the purchase, whether the customer was at a conventional POS terminal or a self-checkout POS terminal, what type of advertisements or information were presented to the customer during checkout, what type of media was presented to the customer during checkout, did the customer purchase an additional item because of a presented advertisement or notification, as well as the other types of information presented herein. In addition to collecting information about the checkout process, the mobile self-checkout software may present a few survey type questions to the customer to assess the customer's satisfaction with the shopping experience. The software may ask the customer to rate their shopping or checkout experience as well as request feedback regarding the same.

The software may process the above information or transmit the above information to a server 72 or other computer to process the information. The information about the checkout experience collected by the mobile self-checkout software can be correlated to the customer's answers to survey questions or to the customer's rating of the shopping or checkout experience. Additionally, the information collected by the mobile self-checkout software may be correlated to continued use of the mobile self-checkout software by the customer.

In this way, the retail store may use much more detailed data to evaluate and improve their store, shopping, and checkout processes. Rather than simply relying on whether or not a customer reported a good shopping experience, the store has data about the shopping and checkout process matched to the customer rating. A computer or server may correlate any of the above data to the feedback given by the customer and compare data sets between different customers to determine what aspects of the shopping experience are good and what aspects need improvement.

The flowchart and block diagrams of the Figures illustrate the architecture, functionality, and operation of possible implementations of systems, methods, and computer program products according to one or more embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for determining a customer's location in a retail store checkout line comprising:
   activating a mobile self-checkout software on a mobile electronic device;
   the mobile electronic device sampling ambient noise;
   the mobile electronic device analyzing said ambient noise to determine if the mobile electronic device is within a threshold distance of a POS terminal;
   the mobile electronic device analyzing said ambient noise to determine if a beep sound from a POS terminal bar code scanner is present; and;
   the mobile electronic device analyzing the rate of repetition of the beep sound to determine if the POS terminal is a self-checkout terminal or a conventional POS terminal.

2. A method for determining a customer's location in a retail store checkout line comprising:
   activating mobile self-checkout software on a mobile electronic device;
   the mobile electronic device sampling ambient noise; and
   the mobile electronic device analyzing said ambient noise to determine if the mobile electronic device is within a threshold distance of a POS terminal; and
   a returns POS terminal producing a predetermined noise when the customer is present at the returns POS terminal and the mobile electronic device analyzing said ambient noise to determine if said predetermined noise is present;
   wherein said predetermined noise is not produced by a POS terminal during normal operations.

3. A method for determining a customer's location in a retail store checkout line using a mobile device comprising:
   a mobile electronic device recording ambient noise;
   analyzing with the mobile device the ambient noise to detect sounds from a POS terminal;
   analyzing with the mobile device the sounds from the POS terminal to determine the proximity of the customer to the POS terminal;
   the returns POS terminal producing a unique noise not produced during normal operation and
   the mobile electronic device analyzing the ambient noise to determine whether said unique noise is present to determine if the mobile electronic device is within a threshold distance of a POS terminal.

4. A method for determining a customer's location in a retail store checkout line using a mobile device, comprising:
   the mobile electronic device recording ambient noise;
   the mobile electronic device analyzing the ambient noise to detect sounds from a POS terminal;
   the mobile device analyzing the sounds from the POS terminal to determine the proximity of the customer to the POS terminal;
   the mobile device analyzing the ambient noise to detect scanning beeps from a POS terminal; and
   the mobile device analyzing the rate of repetition of said beeps to determine if the customer is within a threshold distance of a self-service POS terminal or a conventional POS terminal.

* * * * *